Nov. 27, 1923. 1,475,536
C. E. BONINE ET AL
MACHINE FOR WASHING MILK CANS OR SIMILAR RECEPTACLES
Filed May 3, 1920 6 Sheets-Sheet 1
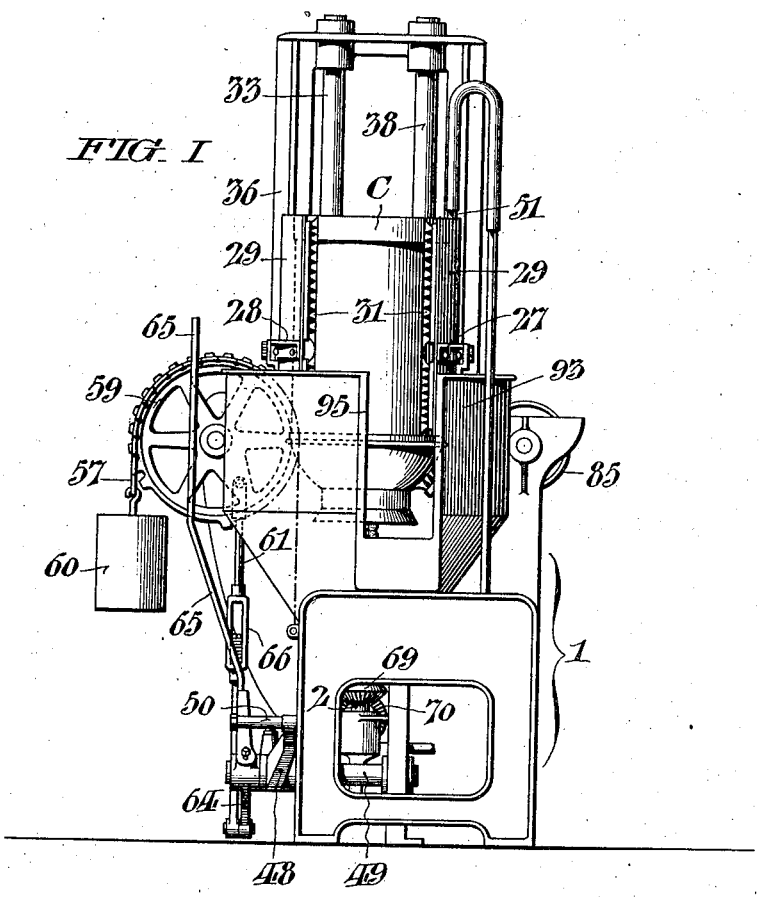
FIG. I
Inventor
Charles E. Bonine &
Henry W. Stauffer,

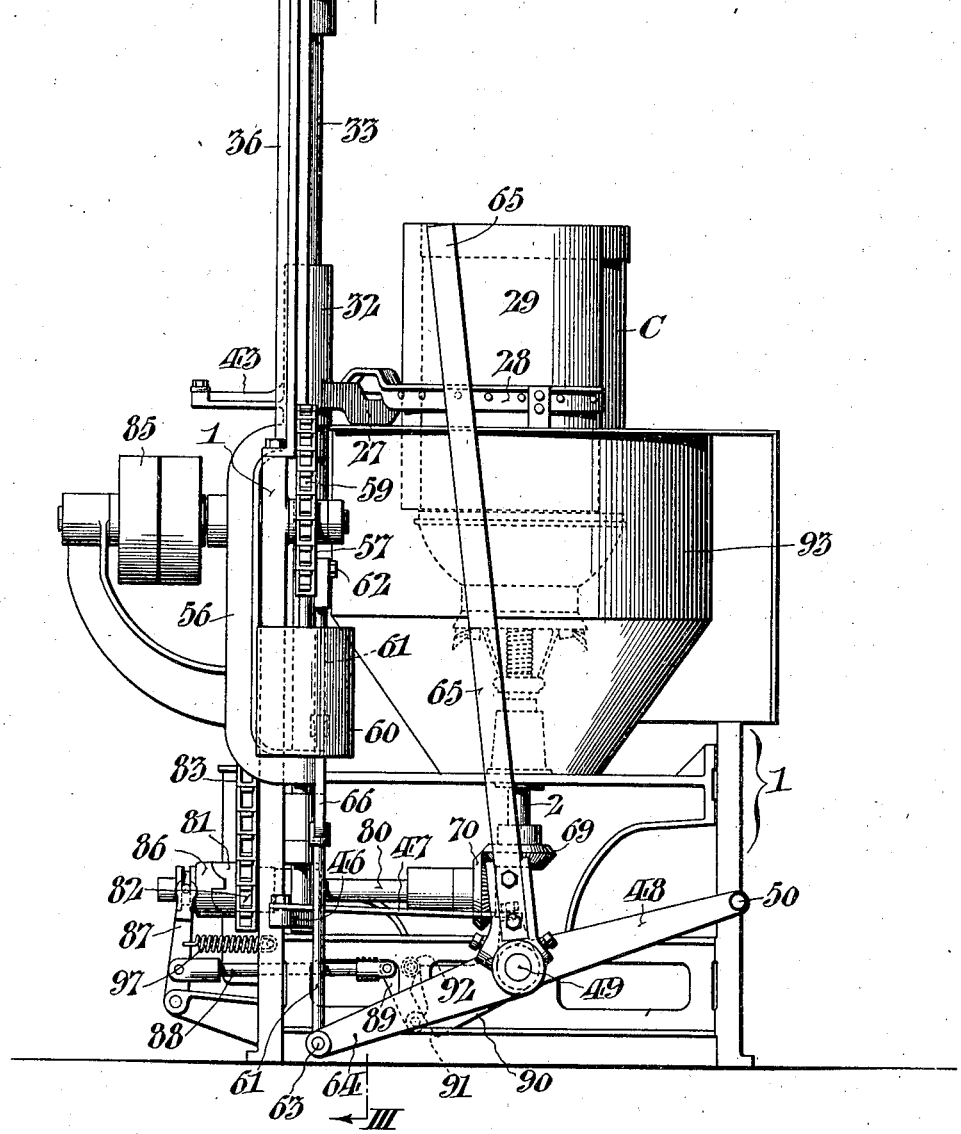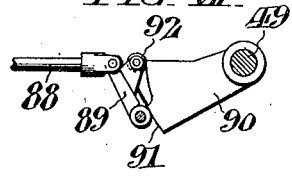

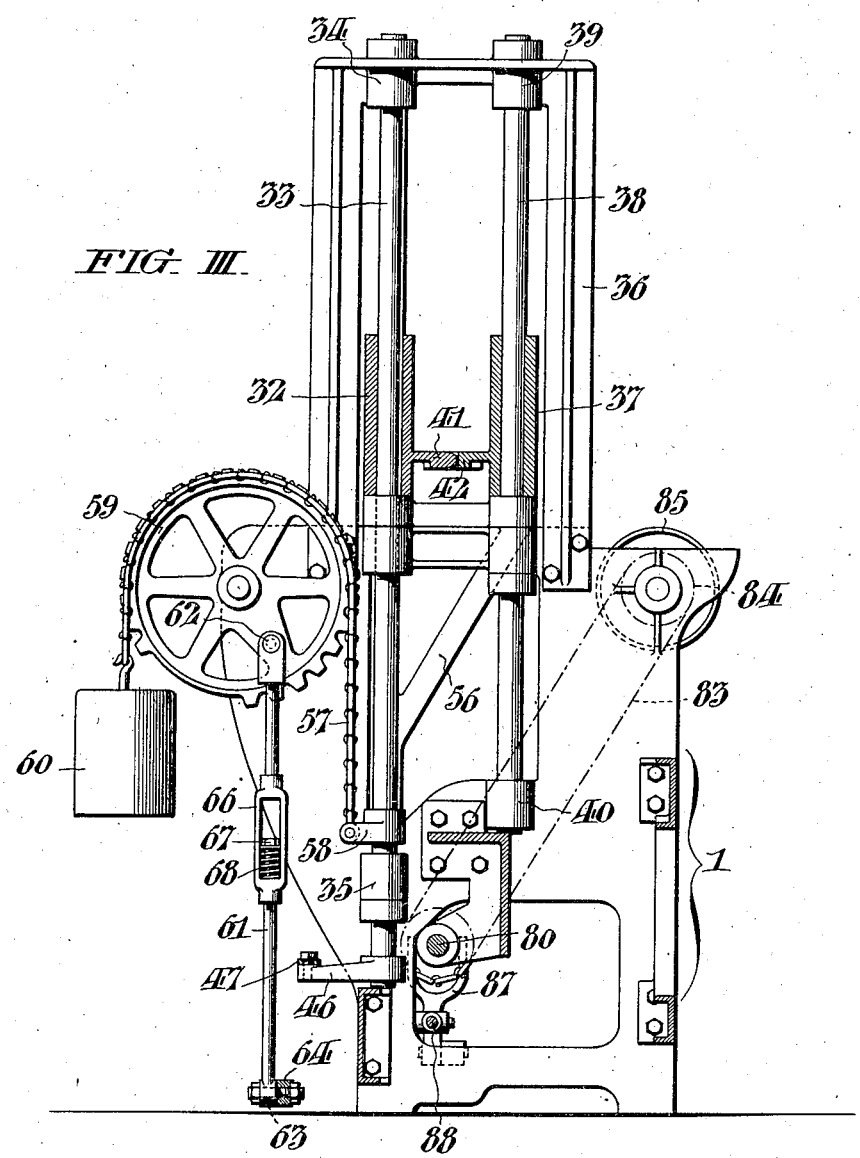

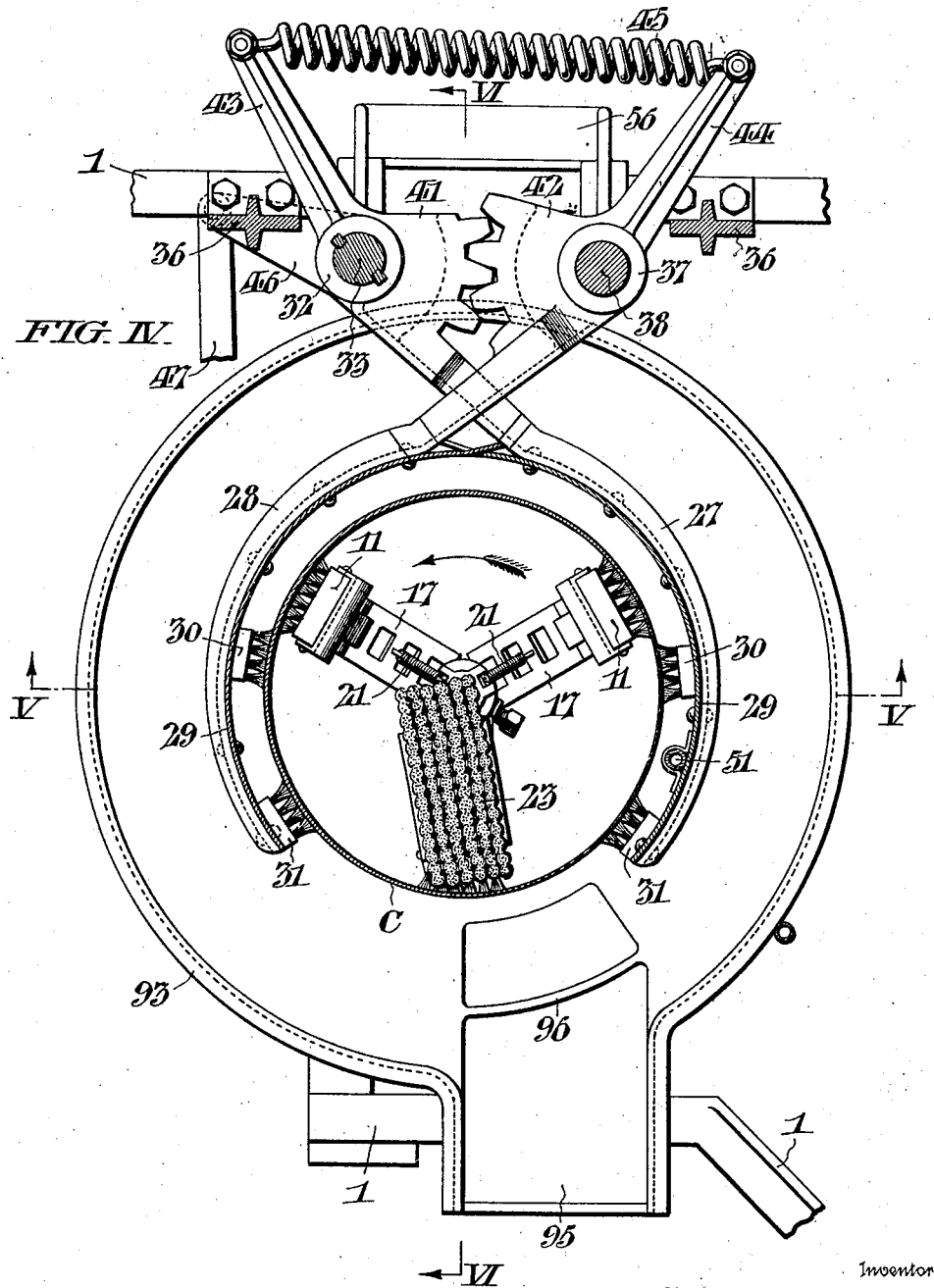

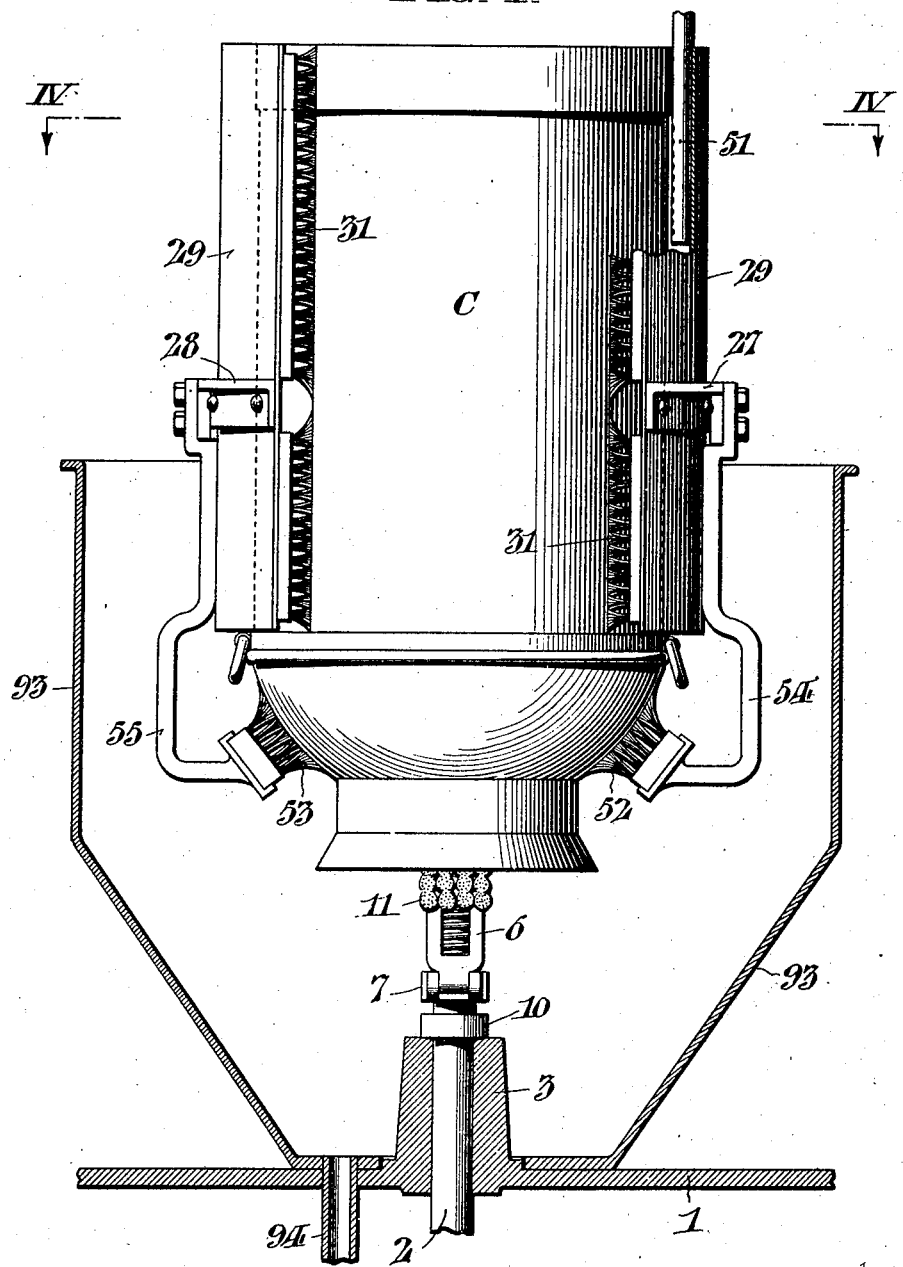

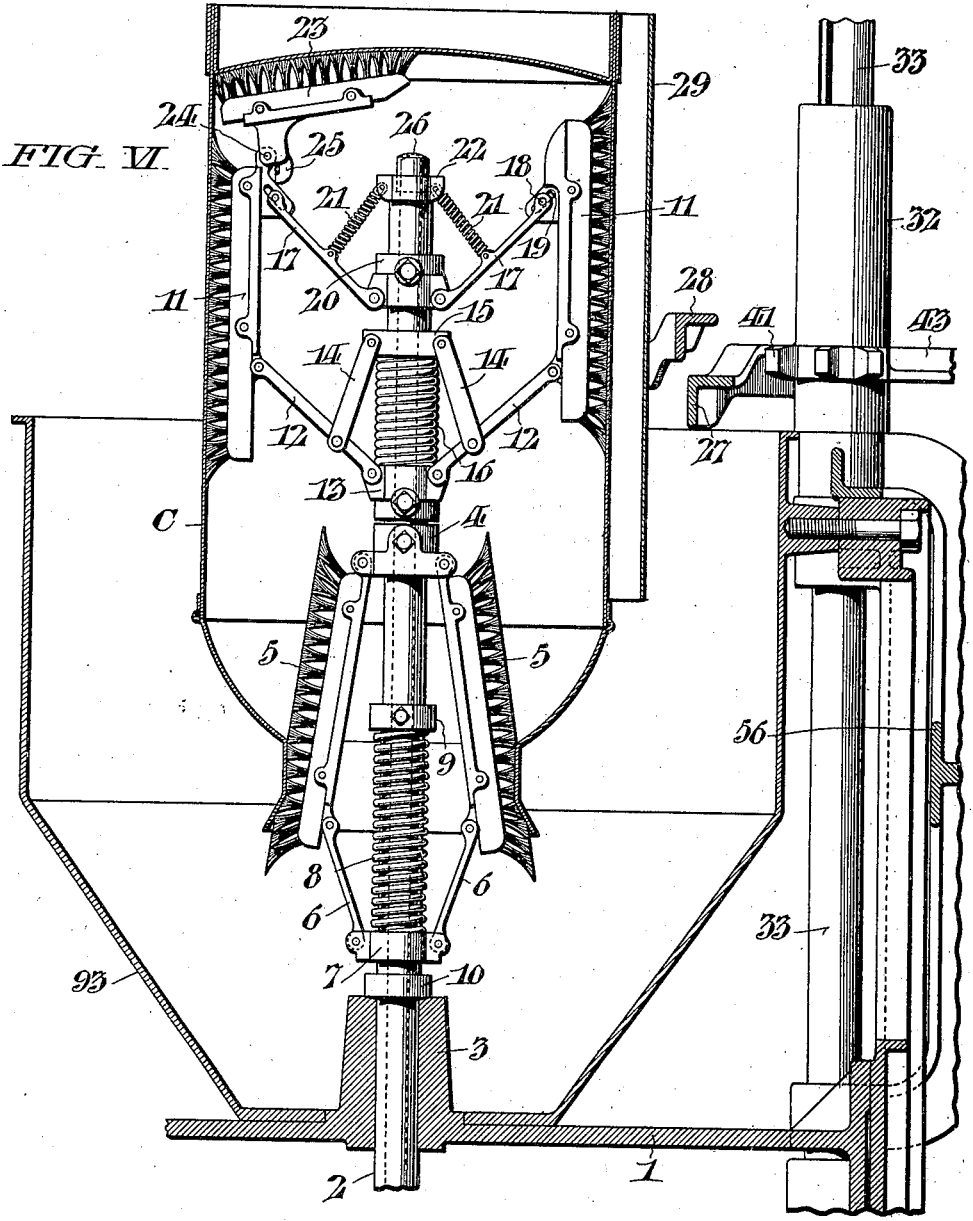

Patented Nov. 27, 1923.

1,475,536

UNITED STATES PATENT OFFICE.

CHARLES E. BONINE, OF MELROSE PARK, AND HENRY W. STAUFFER, OF MANHEIM, PENNSYLVANIA, ASSIGNORS TO JOHN H. MOSEMAN, OF LANCASTER, PENNSYLVANIA.

MACHINE FOR WASHING MILK CANS OR SIMILAR RECEPTACLES.

Application filed May 3, 1920. Serial No. 378,551.

*To all whom it may concern:*

Be it known that we, CHARLES E. BONINE and HENRY W. STAUFFER, citizens of the United States, residing, respectively, at Melrose Park, in the township of Cheltenham, county of Montgomery, and State of Pennsylvania, and at Manheim, in the county of Lancaster and State of Pennsylvania, have jointly invented certain new and useful Improvements in Machines for Washing Milk Cans or Similar Receptacles, whereof the following is a specification, reference being had to the accompanying drawings.

The invention relates to machines for washing milk cans or the like, and is more especially directed to brush washing mechanism for machines of this character. The present invention was formerly disclosed in our pending application for improvements in milk can washing machines Serial No. 169,840, filed under date of May 21, 1917, and, as a result of requirement for division, has been made the subject of a separate application.

The improvement comprehends mechanism whereby the interior of the receptacles is thoroughly washed with a suitable liquid and at the same time, scoured by brushes rotating at high speed and thrust against the inner surfaces of the cans by centrifugal force, in opposition to springs which normally tend to retain the brushes in collapsed position.

The invention also comprehends means for cleaning the exterior, in the form of brushes which engage the surface of the can while the latter is rotating; and said brushes are capable at other times, in association with suitable controlling means, of clamping the can to hold the same from rotation during the scouring of the interior.

The invention further includes means whereby the can may be shifted relative to the brushes in facilitating the scouring operation, as a result of which, the cleansing of every portion of the can is assured.

Another important feature of the invention is vested in means for supplying a suitable washing solution both to the interior and exterior of the can during the brushing operation.

The organization by which these results are accomplished will be best understood by reference to the accompanying drawings in which:

Fig. I is a side elevation of a can washing machine conveniently embodying our invention.

Fig. II is an end elevation of the same as viewed from the left of Fig. I, upon a somewhat enlarged scale.

Fig. III is a vertical sectional elevation through the plane indicated by the arrows III—III in Fig. II.

Fig. IV is a plan view on enlarged scale of the greater portion of the machine, a can being shown sectioned in the position assumed during the brushing operation.

Fig. V is a vertical sectional elevation along the line V—V in Fig. IV.

Fig. VI is a similar view at right angles to Fig. V as indicated by the arrows VI—VI in Fig. IV, and Fig. VII is a detail illustration of the controlling means for the clutch which is interposed in the driving mechanism for the rotating brushes adapted for scouring the interior of the can.

Referring more in detail to the drawings, our improved washing machine consist of a main supporting frame 1, which may be of any desired shape and construction, for supporting the various members of the machine. Mounted in suitable bearings is a vertical shaft 2. This vertical shaft 2, is in the form of a pipe, and extends well up above its supporting bearing which is indicated at 3. Mounted on the shaft 2, is a fixed collar 4. Pivotally attached to this fixed collar 4, are three equally spaced brushes 5, 5, which are particularly adapted for engaging the interior of the mouth of the milk can. The milk can indicated at C is shown as inverted and as being engaged by these brushes in Fig. VI of the drawings. The brushes 5, 5 are pivotally attached at their lower ends to links 6, 6, which are in turn pivoted to a collar 7, free to slide longitudinally on the shaft 2. A spring 8, coiled about the shaft engages at its lower end the collar 7, and at its upper end, a fixed collar 9. This spring normally forces the collar 7, downwardly into engagement with a fixed collar 10, and holds the brushes retracted to their extreme inward position. As the shaft 2, rotates, the centrifugal force acting on the brushes 5, 5, will force the lower ends of same outwardly, compressing the spring 8, and this causes the brushes to engage the inner wall of the mouth of the can.

Located above the brushes 5, 5, are three brushes 11. These brushes are equally spaced angularly about the shaft and are similarly supported. Each brush is pivoted adjacent to its lower end, to a link 12, which is, in turn, pivoted to a fixed collar 13, carried by the shaft 2. To each link 12, is pivoted a double link 14. These links 14, are pivoted to a sliding collar 15. A spring 16, is located between the collars 13, and 15, and normally serves to force the collar 15, upwardly thereby drawing the lower ends of the brushes inwardly away from the walls of the can. A link 17, has been provided for each brush 11. This link 17, has a pin 18, sliding freely in a slot 19, in a bracket attached to the brush. The lower end of the link 17, is pivoted to a collar 20, which is fixed to the shaft 2. A spring 21, is attached at its lower end to the link 17, and at its upper end to a fixed collar 22, carried by the shaft 2. There is a spring 21, for each link 17. These springs normally tend to draw the upper ends of the brushes 11 inwardly. From the above it will be apparent that each brush is mounted so as to move independently at its upper and lower ends and the centrifugal force acting on the brush will carry it outwardly against the inner surface of the can. When, however, the shaft stops rotating, the spring 16, acting on the collar 15, will draw the lower ends of the brushes inwardly, and at the same time the springs 21, will also draw the upper ends of the brushes inwardly.

Mounted on one of the brackets adjacent to the upper end of the brushes is another brush, indicated at 23, which is adapted to engage the inside of the bottom of the can. This brush is pivoted at 24, to the bracket, and is provided with a stop 25, which is adapted to engage the bracket and normally hold the brush 23, substantially horizontal. By this construction, the inner surface of the can may be thoroughly scoured or cleaned by the brushes referred to, and the washing water, which is preferably charged with a soda solution is conveyed to the brushes and the inner walls of the can through the interior of the shaft 2, which, as above noted, is in the form of a pipe, terminating in a nozzle 26, at its upper end.

During a portion of the brushing operation, the can is supported, held from rotation, and raised and lowered by two clamping arm 27 and 28. The semi-cylindrical splash guards 29, 29, are bolted to arms 27, and 28, and extend throughout the greater length of the can. Fixed to the interior of the guards 29—29, are the vertically arranged brushes 30, 30, and 31, 31. The arm 27, is formed integrally with the sleeve 32, which is splined on a shaft 33, but has capacity for free movement endwise thereon. The shaft 33, (see Fig. III) is journalled in bearings 34, and 35, the bearing 35, being carried by the frame of the machine, and the bearing 34, by the bracket 36, bolted to the frame of the machine, and extending upwardly therefrom. The arm 28, is formed integrally with the sleeve 37, which is free upon a shaft 38, the latter being journalled at one end in the bearing 39, of the bracket 36, and at the other in the bearing 40, carried by the frame. The sleeves 32, and 37, are provided with meshing segmental gears 41, and 42, respectively, and also with projecting arms 43, and 44, respectively. A spring 45, spanned between the outer ends of the arms 43, and 44, normally tends to force the arms 27, and 28, toward each other so as to grip the can. The shaft 33, carries at its lower end an arm 46, which is pivotally connected to a link 47, (see Figs. II and III). The link 47, is pivoted at its other end to a rocker 48, which is freely mounted on the shaft 49. This rocker 48, has its free arm terminating in a treadle 50, for the foot of the operator.

When the operator places his foot on this treadle 50, and presses downwardly, the rocker 48, through the link 47, will cause the shaft 33, to move in a counter-clockwise direction, and this, through the segmental gears 41, and 42, will rotate the shaft 38, and thus cause the arms 27, and 28, to swing away from the can, and release the same. It will thus be apparent that the arms, 27, and 28, may be so controlled by the treadle 50, in co-operation with the spring 45, as to grip the can and prevent it from rotating, or lightly engage the can to permit the same to rotate with the inner brushes. This enables the can to be rotated through contact with the inner brushes, whereupon the outer brushes become functional in scouring the exterior surface of the can.

A perforated pipe 51, is carried by the semi-cylindrical guard 29, and this perforated pipe is connected with a suitable supply (not shown) of the washing solution. Through this pipe, the washing water is thrown against the surface of the can which is thoroughly washed by the aid of the brushes, as above described.

Brushes 52, and 53, may also be provided, for washing the lower part of the body of the can, and these brushes are carried by depending arms 54, and 55, which are respectively bolted to the arms 27, and 28, (see Fig. V). The sleeves 32, and 37, may be simultaneously shifted vertically on their supporting shafts by means of a bracket 56, (see Fig. III), which serves as a supporting means for them. A chain 57, is connected to a lug 58, attached to the bracket 56, and runs over a sprocket wheel 59. A weight 60, attached to the other end of the chain, serves as a means for counterbalancing the weight of the can, and the supporting parts therefor. The sprocket wheel 59, is moved through a part of a rotation by means of a link 61, which is pivoted at 62, to the sprocket wheel and which is also pivoted at 63, to an arm 64, fixed to the shaft 49. The hand lever 65, fixed to the shaft 49, serves as a means for oscillating the arm 64. The link 61, is formed in sections. The upper section of the link carries a guide 66, into which the lower section extends. The lower section of the link is formed so as to slide in this guide. A spring 68, is interposed between a head 67 on said lower section of the link and the lower end of the guide 66. This spring permits a certain amount of lost motion and together with the guide 66 permits the operator to shift the lever 65, a limited extent, for a purpose hereinafter specified.

It will be apparent from the above description, that when the lever 65, is swung to the right, as viewed in Fig. II, the lower section of the link 61, will gradually slide up in the guide 66 and finally striking the upper end of the guide 66, will rotate the sprocket wheel and raise the can. A movement of the lever 65, in the opposite direction, will lower the can onto the inner brushes.

The shaft 2, carries at its lower end a bevel gear 69, which meshes with the bevel gear 70, on the shaft 80. This shaft 80, carries a clutch having an inner member 81, which is fixed on the shaft and which carries a sprocket wheel 82, co-operating with the sprocket chain 83, driven by a sprocket wheel 84, on the main shaft having the belt wheel 85, (see Figs. II and III). The outer member of the clutch, indicated at 86, is splined to the shaft 80, and has a free endwise movement thereon. A yoke lever 87, is connected to this member 86, of the clutch for shifting the same. A link 88, is pivoted to the yoke lever at one end and at the other, to a rocker 89. A spring 97, fastened at one end of the frame and at its other end to the yoke lever 87, normally tends to move the clutch members into engagement to cause the shaft 2, to be driven from the main shaft. Fixed to the shaft 49, is a controlling plate 90, which is provided with a cam face 91, co-operative with the roller 92, on the rocker 89. This cam face 91, is shaped so that when the parts are in the position shown in Figs. II and VII, the spring 97, holds the clutch members in engagement. When, however, the plate 90, is swung in a clock-wise direction, from the position shown in Fig. VII, the higher portion of the cam surface 91, will engage the roller 92, and separate the clutch members and hold them separated so long as the roller is on this high portion of the controlling surface.

The configuration of the cam 90, is such that the clutch will be shifted to rotate the brushes immediately after the handle 65, is moved to lower the can. By this arrangement every portion of the interior of the can is thoroughly subjected to the action of the brushes, and a wide range of movement between the can and brushes is afforded without disengaging the clutch.

As soon as the can is fully raised to its upper position after the brushing is completed, the shaft 80, will cease rotation and permit the brushes to be disengaged from the inner surface of the can. After it has been raised to the proper position for removal, the operator by depressing the treadle 50, separates the arms 27 and 28, and releases the same from the grip upon the can. Extending about the lower part of the can is a casing 93. This casing is mounted on the frame and serves to collect the washing solution which passes off from the casing through the suitable drain pipe 94, in the bottom thereof (see Fig. V).

To facilitate the removal of the can, we have provided an opening 95, through the side wall of the casing 93, which is extended outwardly in the region of the opening and is also provided with a baffle 96. The baffle 96, is so located that wash water which is thrown from the outer surface of the can will be collected behind the baffle. This wash water is for the purpose of wetting a hand brush which is kept in the pool of water so as to be readily accessible to the operator, and used to wash portions of cans of such configuration as not to be reached by the brushes provided regularly upon the machine.

In operation, the can to be washed is placed over the brushes 5, 11, 23 while they are stationary, the operator pressing down on the treadle 50 with his foot, and the lever 65 being at its extreme right-hand position with the clutch 86 disengaged. Upon release of foot pressure on the treadle 50, the can is gripped between the holding arms 27 and 28 through the action of the spring 45, which causes them to close upon it.

The can is now lowered by moving lever 65 to the left hand a short distance thus throwing in the clutch 86 and causing the shaft 2 to rotate.

Thereafter the can "C" may be raised and lowered to a limited extent without stopping the rotation of the shaft 2, due to the lost motion connection provided for by the guide 66 in the link 61, and the action of the counterweight 60, while the spring 68 serves as a buffer to permit the upper section of said link 61 to move slightly relative to the lower section and thereby cushion such movement and preventing any jarring. The throwing of the lever 65 to a greater extent, stops the shaft 2 and then raises the can "C" to a position to facilitate removal. By pressure on the treadle 50, the operator may release the can "C" so that it will rotate with the brushes and its outer surface be washed.

It is obvious that minor changes in the details of construction may be made without departing from the spirit of the invention as set forth in the appended claims.

Having thus described our invention, we claim:

1. A milk can washing machine including, in combination, a vertically disposed hollow rotating shaft, said shaft having a nozzle for discharging the wash water against the interior of the can, brushes carried by said shaft for engaging the interior of the can, arms for supporting the can, brushes carried by said arms and engaging the outer surface of the can, said arms being mounted on separate shafts and having intermeshing segmental gears, whereby the movement of one arm is imparted to the other, a spring for normally forcing the arms toward each other, and treadle control means for rotating one of the shafts to separate the arms.

2. A milk can washing machine comprising, in combination, gripping means including brushes for the exterior of a can normally tending to close upon and grip the can, collapsible revoluble brushes for the interior of the can automatically tending to expand when revolving, means controllable by the operator for opening said first mentioned brushes to release the can from their grip, and means controlled by the lowering and raising of the can gripping means for starting and stopping said interior brushes.

3. A milk can washing machine comprising, in combination, gripping means including brushes for the exterior of a can adapted to close and grip the can or to open and release it, collapsible revoluble brushes for the interior of the can automatically tending to expand when revolving, means controllable by the operator for lowering and raising the gripping means, and means for starting and stopping said interior brushes controlled by the raising and lowering of the gripping means as aforesaid.

4. A milk can washing machine including, in combination, a vertically disposed rotating shaft, brushes carried by the shaft over which the can may be inverted, clamping arms having brushes for engaging the outer surface of the can, a spring for normally holding the arms in clamping engagement with the can, treadle controlled means for separating the arms, manually operable means for raising and lowering the clamping arms, means for coonterbalancing the weight of the can and clamping arms, a clutch for controlling the rotation of the aforesaid vertical shaft, means for separating the clutch members to interrupt the rotation of the vertical shaft, and a lost motion connection intermediate the manually operable and counter-balancing means, whereby a limited up and down movement of the can gripping arms is provided for during the rotation of the aforesaid vertical shaft.

5. A milk can washing machine including, in combination, a vertically disposed rotating shaft, brushes carried by said shaft over which the can may be inverted, clamping arms having brushes for engaging the outer surface of the can, a spring for normally holding the arms in clamping engagement with the can, treadle controlled means for separating the clamping arms, manually operable means for raising and lowering the clamping arms, a counter-balance for the weight of the can and clamping arms, a spring-influenced clutch for controlling the rotation of the vertical shaft, cam controlled link motion for separating the clutch members to interrupt the rotation of the vertical shaft, and a spring influenced lost motion connection intermediate the manually operable and counter-balancing means, whereby the clamping arms may be raised and lowered to a limited extent during the engagement of the clutch members, and said manually operable means also permitting separation of the clutch members to stop the rotation of the vertical shaft prior to the lifting of the can to its extreme upper position for removal from the machine.

6. A milk can washing machine including, in combination, a vertically disposed hollow rotating shaft having a nozzle at its upper end, brushes mounted on the shaft so as to be moved outwardly and downwardly in a plane substantially normal with respect to the circumference of the can, a brush pivoted to the upper end of one of the aforesaid brushes and movable therewith to sweep the inside bottom of the can while moving toward the periphery thereof during the rotation of the vertical shaft, and resilient means for retracting the brushes towards each other when said shaft is stopped.

7. A milk can washing machine including, in combination, a vertically disposed hollow rotating shaft having a nozzle at its upper end, a plurality of brushes to sweep the sides of the can, linkage means mounting the brushes on the shaft for movement in mutual parallelism, one of said brushes being longer than the others to reach the joint between the side and bottom of the can, a brush pivoted to the inner end of one of the shorter brushes and having a stop for maintaining the same substantially horizontal, said pivoted brush being adapted to sweep the inside bottom of the can, and retractile springs for drawing all of the brushes toward the vertical shaft as rotation of the latter ceases.

8. A milk can washing machine including, in combination, a vertical shaft over which the can is inverted, brushes mounted on the shaft to scrub the interior of the can, one of said brushes having a pivoted extension adapted to sweep the inside bottom of the can, a pair of opposed brushes carried by the shaft to engage the inside neck of the can, said last mentioned brushes being pivoted at one end to the vertical shaft for movement toward and away from each other in diverging relation, and a spring influenced linkage connection between the opposite ends of the brushes and the shaft normally tending to force said brushes to inwardly retracted position.

In testimony whereof, we have hereunto signed our names at Manheim, Pennsylvania, this 15th day of April, 1919.

CHARLES E. BONINE.
HENRY W. STAUFFER.

Witnesses:
 WM. J. SNYDER,
 WIEN A. ENSMINGER.